(12) United States Patent
Chen

(10) Patent No.: US 7,784,388 B2
(45) Date of Patent: Aug. 31, 2010

(54) BLADE CLAMPING DEVICE

(75) Inventor: Yasheng Chen, Nanjing (CN)

(73) Assignee: Chervon Limited, Nanjing Jiangsu (CN)

( * ) Notice: Subject to any disclaimer, the term of this patent is extended or adjusted under 35 U.S.C. 154(b) by 652 days.

(21) Appl. No.: 11/804,243

(22) Filed: May 17, 2007

(65) Prior Publication Data

US 2007/0272067 A1    Nov. 29, 2007

(30) Foreign Application Priority Data

May 25, 2006    (CN) ........................ 2006 2 0071900

(51) Int. Cl.
B23D 51/08    (2006.01)
(52) U.S. Cl. ...................... 83/699.21; 83/750; 269/237; 269/229
(58) Field of Classification Search ............... 83/699.21, 83/750, 776, 746, 698.31; 24/455; 30/158, 30/159; 269/3, 6, 237, 216, 229; 279/109, 279/76, 77, 44

See application file for complete search history.

(56) References Cited

U.S. PATENT DOCUMENTS

| 614,724 | A | * | 11/1898 | Jennings ...................... 269/221 |
| 928,370 | A | * | 7/1909 | Feickert ...................... 280/176 |
| 1,485,731 | A | * | 3/1924 | Stangbye ...................... 269/103 |
| 2,240,755 | A | * | 5/1941 | Briggs .......................... 30/394 |
| 2,595,579 | A | * | 5/1952 | Hawkins ...................... 81/379 |
| 2,788,687 | A | * | 4/1957 | Ridge .......................... 269/203 |
| 3,071,010 | A | * | 1/1963 | Lupkas .......................... 74/1 R |
| 3,346,929 | A | * | 10/1967 | Webb .......................... 24/494 |
| 3,573,434 | A | * | 4/1971 | Wallace et al. ............... 235/443 |
| 3,617,044 | A | * | 11/1971 | Strange .......................... 269/6 |
| 4,106,181 | A | * | 8/1978 | Mattchen ..................... 29/450 |
| 5,322,302 | A | * | 6/1994 | Quirijnen ..................... 279/22 |
| 5,443,276 | A | * | 8/1995 | Nasser et al. ................. 279/77 |
| 5,722,309 | A | * | 3/1998 | Seyerle .................... 83/699.21 |
| 5,815,927 | A | * | 10/1998 | Collins .......................... 30/161 |
| 6,112,420 | A | * | 9/2000 | Schickerling ................ 30/392 |
| 6,158,127 | A | * | 12/2000 | Taylor .......................... 30/158 |
| 6,158,729 | A | * | 12/2000 | Tsai ........................... 269/228 |
| 6,233,833 | B1 | * | 5/2001 | Grant et al. .................... 30/392 |
| 6,308,420 | B1 | * | 10/2001 | Moser .......................... 30/161 |
| 6,397,476 | B1 | * | 6/2002 | Onion .......................... 30/160 |
| 6,662,698 | B2 | * | 12/2003 | Wheeler et al. .......... 83/699.21 |
| 6,848,186 | B1 | * | 2/2005 | Chen et al. ..................... 30/392 |
| 7,003,888 | B2 | * | 2/2006 | Bigden et al. ................. 30/392 |

(Continued)

*Primary Examiner*—Kenneth E. Peterson
*Assistant Examiner*—Sean Michalski
(74) *Attorney, Agent, or Firm*—McDermott Will & Emery LLP

(57) ABSTRACT

A blade clamping device comprises a main body which includes two opposited sidewalls and a base plate connected therebetween for defining a cavity for receiving a blade therein. A fixing device mounted between the two sidewalls. A pivot lever is pivotly mounted on the main body about an axis for driving the fixing device to fix or release the blade. A spring is biased between the main body and the pivot lever, which can hold the pivot lever in a predetermined position at which the fixing device clamps the blade tightly. The blade clamping device of the present invention can be kept in the position where the blade is released such that the blade can be easily detached or inserted as required. Furthermore, the operation becomes convenient and easy because of the short moving distance of the operation handle when an operator turns round the pivot lever to fix or release blade.

8 Claims, 5 Drawing Sheets

U.S. PATENT DOCUMENTS

| | | | |
|---|---|---|---|
| 7,040,023 B2 * | 5/2006 | Nemazi et al. | 30/392 |
| 7,059,053 B2 * | 6/2006 | Sakai | 30/160 |
| 7,107,685 B1 * | 9/2006 | Anderson | 30/158 |
| 7,174,590 B1 * | 2/2007 | Quenzi | 7/158 |
| 7,251,897 B2 * | 8/2007 | Shuhua | 30/392 |
| 7,257,900 B2 * | 8/2007 | Wheeler et al. | 30/392 |
| 7,526,867 B2 * | 5/2009 | Park | 30/392 |
| 2003/0121388 A1 * | 7/2003 | Wheeler et al. | 83/699.21 |
| 2007/0131075 A1 * | 6/2007 | Zhang et al. | 83/699.21 |
| 2007/0131076 A1 * | 6/2007 | Yasheng | 83/699.21 |
| 2007/0266838 A1 * | 11/2007 | Chen | 83/699.21 |
| 2008/0307656 A1 * | 12/2008 | Lin | 30/159 |
| 2009/0144986 A1 * | 6/2009 | Frazer | 30/159 |
| 2009/0271989 A1 * | 11/2009 | VanHoy | 30/159 |

\* cited by examiner

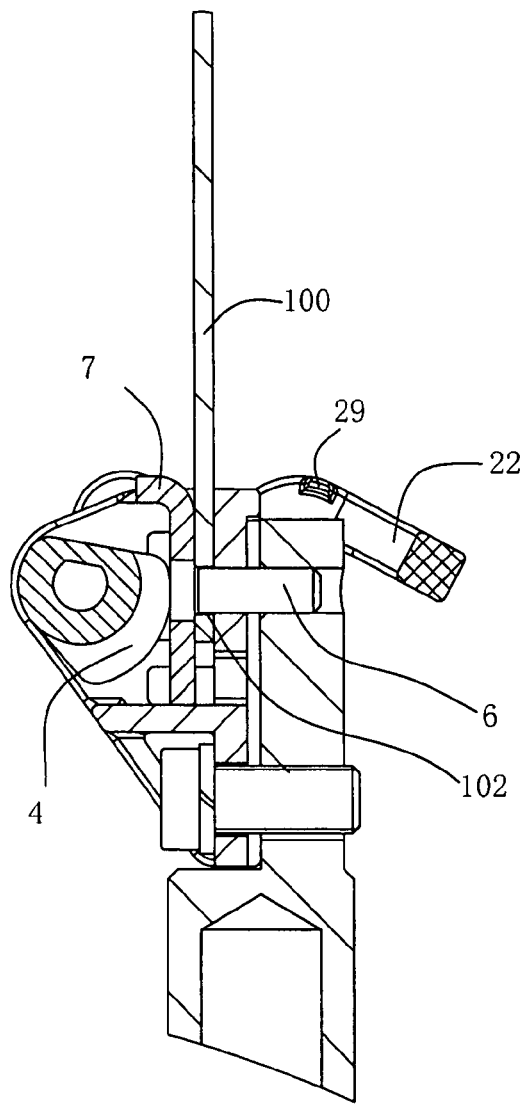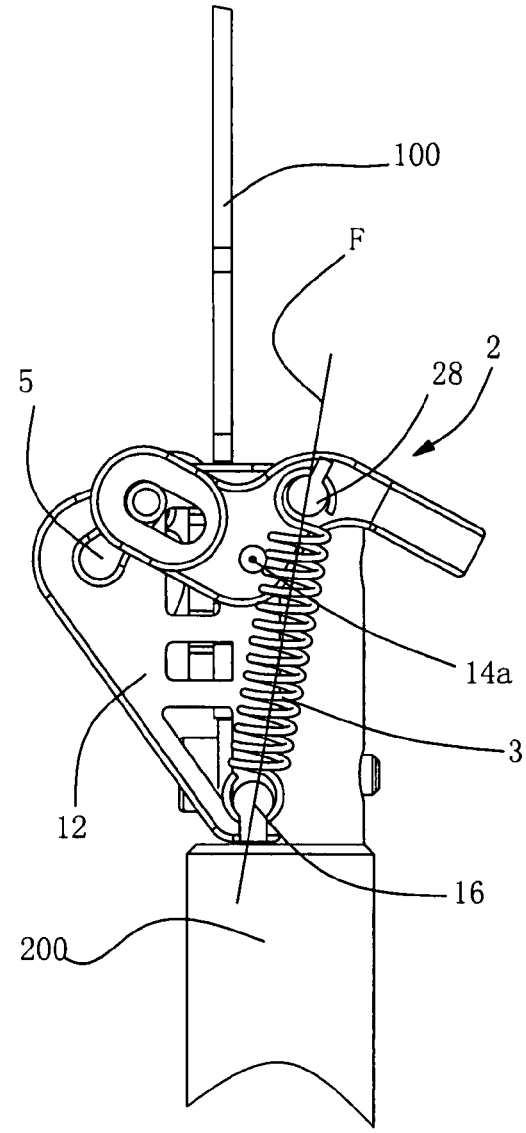
Fig 3B
Fig 3A

US 7,784,388 B2

BLADE CLAMPING DEVICE

CROSS-REFERENCE TO RELATED APPLICATIONS

This application claims priority to Chinese Application No. 200620071900.6 filed May 25, 2006, the entire disclosure of which is incorporated herein by reference. Priority to this application is claimed under 35 U.S.C. 119, 120 and/or 365.

FEDERALLY SPONSORED RESEARCH OR DEVELOPMENT

Not Applicable.

TECHNICAL FIELD

The present invention relates to a blade clamping device for a cutting tool, especially relates to a device for quick clamping the blade of a reciprocating saw.

BACKGROUND OF THE INVENTION

A reciprocating saw is a cutting tool with a saw blade which is driven to perform reciprocating movement during operation, typically known as circular saw, saber saw, scroll saw, and etc., and the saw blade of which is generally elongate shaped. Commonly a reliable and easy operable blade clamping device is one of the most important part of a reciprocating saw for allowing the saw blade to be replaced, removed or repaired as and when required.

A cam is normally used in a clamping device for clamping the blade. In such a case, when the blade needs to be replaced, the operator should rotate the cam to a releasing position and take away the damaged blade, and then place a new one instead. Thereafter, the cam will clamp the blade tightly when the operator releases the cam subsequently. But the cam couldn't remain on its releasing position without continuously force applied on it. In other words, the hand of the operator shouldn't leave the cam or the device which is connected with the cam to keep the cam in releasing position. Obviously, such a clamping device which is only available for the blade to be replaced with two hands is not convenient for use. U.S. Pat. No. 5,946,810 disclosed a blade clamping device which could be kept in releasing position such that it is much more convenient for a blade to be replaced. But the shortcoming is the claming is not reliable enough which may result in swing of the blade during the operation. U.S. Pat. No. 6,612,039 disclosed a blade clamping device which is much more reliable, and is able to be hold in its releasing position, while the inconvenience in assembly and manufacture brought by the complex structure causes high cost.

SUMMARY OF THE INVENTION

In order to solve the problems existed in the prior art, an object of the present invention is to provide an improved blade clamping device which could be kept in releasing position with simple structure and reliable clamping function.

To obtain the object, a blade clamping device of the present invention comprises a main body which includes two opposited sidewalls and a base plate connected therebetween to define a cavity for receiving a blade, a fixing device mounted between the two sidewalls, a pivot lever mounted on the main body and is able to pivot around an axis, wherein a handle is formed at one end of the pivot lever, of which the other end operably connected with the fixing device for moving it between a first position and a second position, wherein in the first position the fixing device fixedly hold the blade and in the second position the blade is released. A support is provided on the main body and the pivot lever respectively. A spring is biased between the two supports such that three relative positions are formed between the pivot lever and the main body, wherein in the first relative position, the pivot axis of the pivot lever across a line wherealong a biasing force of the spring running, in the second relative position, the pivot axis lies at one side of the line and the fixing device fixedly hold the blade, in the third relative position, the pivot axis lies at the other side of the line and the blade is released; wherein in the first relative position, the biasing force of the spring is the greatest.

Because of the relationship between the spring and the pivot axis of the pivot lever as disclosed hereinabove, the pivot lever can be positioned at the second position where the blade is fixed or the third position where the blade is released. Thereafter the blade clamping device can be kept in the position where the blade is released, which is very convenient for operators to replace blades as or when required. Moreover, the pivot lever could reach required position automatically because of the potential energy of the spring. The potential energy is enhanced when the pivot lever is in the first relative position and will be released once the pivot lever pass over the position. Consequently, the operation becomes easy and convenient because of the short moving distance of the handle when operator turns round the pivot lever to fix or release blade.

BRIEF DESCRIPTION OF THE DRAWINGS

Advantages and novel features of the present invention will become apparent from the following detailed description of the preferred embodiment of the invention illustrated in the accompanying drawings, wherein:

FIG. 3A shows the blade clamping device which is in clamping position;

FIG. 3B is a longitudinally broken view of the blade clamping device illustrated in FIG. 3A;

DETAILED DESCRIPTION

Figure 1:
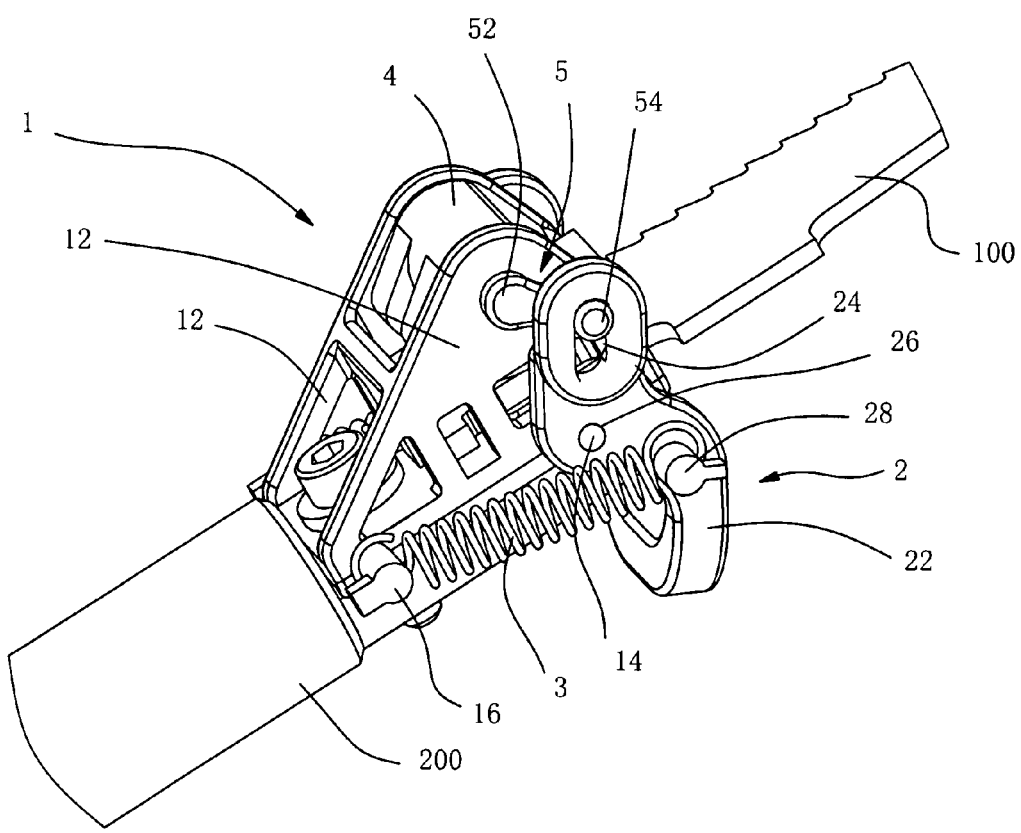
FIG. 1 is a perspective view of the blade clamping device according to the preferred embodiment of the present invention.
Figure 2:
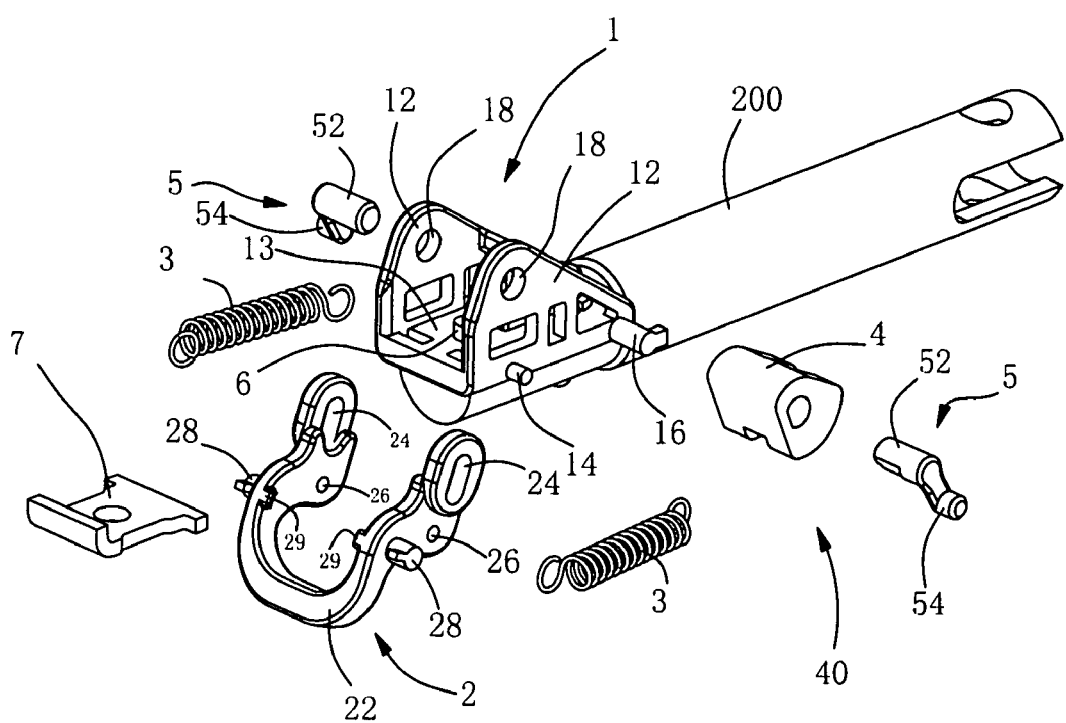
FIG. 2 is an exploded view of the blade clamping device.

As shown in FIG. 1 and FIG. 2, the blade clamping device comprises a main body 1 which is fixedly connected with a tool driven shaft 200. The main body includes two opposited sidewalls 12 and a base plate 13 connected therebetween, by which a cavity 100 is formed for receiving a blade. A pin 6 is protruding from the base plate 13 and is able to insert an aperture 102 of the blade 100. Each of the two opposite sidewalls 12 of the main body 1 comprises a hole 18 for receiving a first end 52 of a swing arm 5 running therethrough and fixed on each end of a cam 4. Accordingly the cam 4 is mounted between the two sidewalls 12 and is able to rotate accompany with swinging of the swing arm 5 in order to fix or release the blade 100. In this embodiment of the present invention, the cam 4 forms the main part of a fixing device 40.

The main body 1 further comprises an pivot 14 and a first support 16 at each side thereof. The blade clamping device further comprises a "U" shaped pivot lever which comprises a handle 22, a pair of second supports 28, a pair of elongate slots 24, a pair of installing holes 26 and a push member 29. More specifically, as an example, the push member 29 is a pair of protrusions. The second end 54 of the swing arm 5 is offset from the first end 52 and gets through the elongate slot 24. In this way, the second end 54 of the swing arm 5 is slidable along the long slot 24. The pivot lever 2 mounted to the pivot 14, through the installing holes 26, and is pivotable thereabout. A pair of springs 3 are stretched connected between the first supports 16 and the second supports 28 and bias a force on the pivot lever 2. In other embodiment, the spring 3 could be compressed. A fixing plate 7 is arranged in the cavity of the main body 1 so as to fix the blade 100 under the pressure of the cam 4.

Figure 4:
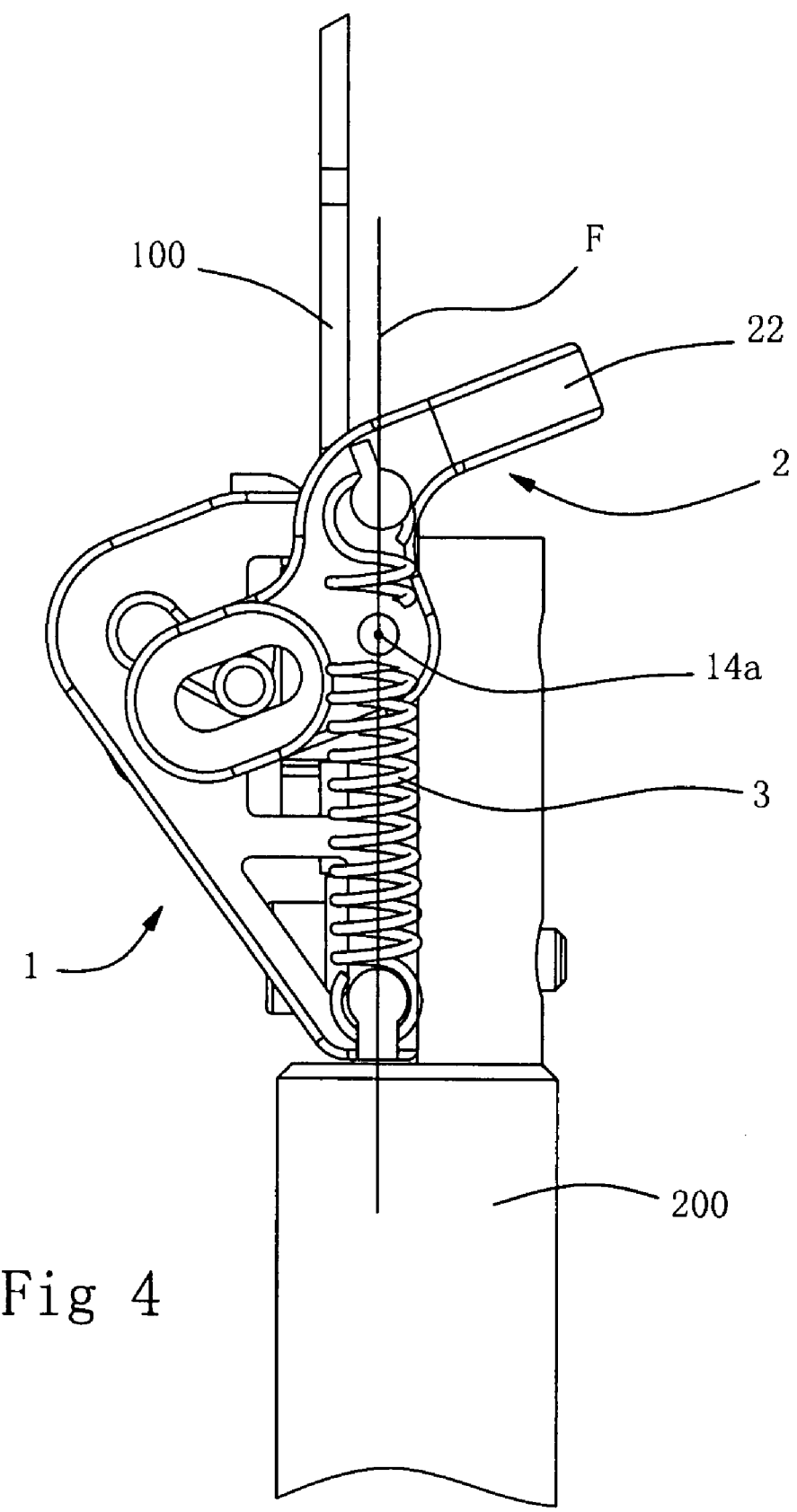
FIG. 4 shows the blade clamping device in critical position.
Figures 5A, 5B:
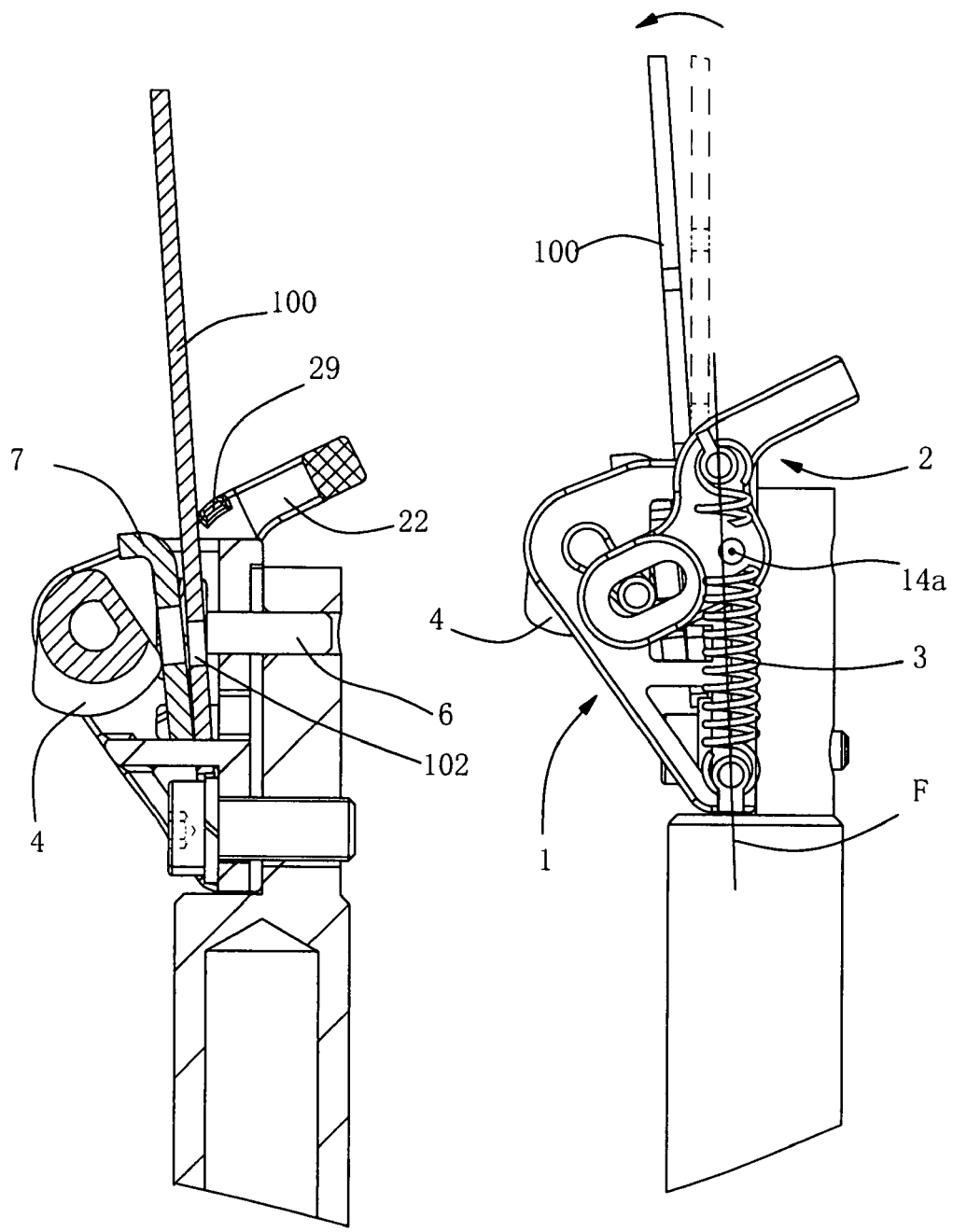
FIG. 5A shows the blade clamping device in releasing position.
FIG. 5B is a longitudinally broken view of the blade clamping device illustrated in FIG. 5A.

Operation position of the blade clamping device and corresponding operation method thereof will be detailedly disclosed hereinafter with reference to FIG. 3 to FIG. 5.

FIG. 3A and FIG. 3B show the blade clamping device which is in clamping position. In the position, the pin 6 is inserted into the aperture 102 of the blade 100, the cam 4 press against the fixing plate 7 and subsequently the blade 100 such that the blade 100 is fixedly clamped. Meanwhile, a pivot axis 14a of the pivot lever 14 lies at one side of a line F wherealong a biasing force of the spring 3 is running.

When it is required to replace the blade 100, an operator should pivot the handle 22 of the pivot lever 2 anticlockwisely as illustrated in the drawings. The pivot axis 14a will across the line F when the handle 22 reaches a predetermined position as illustrated in FIG. 4, in which position the pushing member 29 abuts the blade 100 (not shown) and the blade clamping device is in a critical position. When further pivot the handle 22, the pivot lever 2 will automatically pivot around the pivot 14 anticlockwisely under the biasing of the spring 3, which subsequently brings the second end 54 of the swing arm 5 pivoting around the first end 52 thereof. Accordingly the cam 4 is driven to rotate such as to release the fixing plate 7. Meanwhile the pushing member 29 pushes the blade 100 to a position leaving apart from the pin 6. At that time, the pivot axis 14a of the pivot lever 14 lies at the other side of the line F wherealong a biasing force of the spring 3 is running and the operator can take away the blade 100 easily. The blade clamping device remains in the releasing position after the blade 100 being detached therefrom. Then the operator can insert a new blade and push the blade against pushing member 29 clockwisely. The pivot lever 2 will pivot clockwisely thereby. When the pivot lever 2 passes over the critical position, the pivot lever 2 is automatically driven to continually pivot under biasing of the spring 3, which causing the swing arm 5 to pivot and consequently drives the cam 4 to rotate to the position where the fixing plate 7 is pressed by the cam 4. Whereby the new blade is fixed.

The cam 4 is used in this embodiment to fix the blade, while various other devices may be used for the fixing device 40 according to the present invention. For example, roller and oblique slot can be used instead with the other parts remain the same as in the embodiment described hereinabove. Clamping devices composed of roller and oblique slot have been disclosed in the prior art. For detailed description, one can refer to the U.S. Pats. No. 5,987,758 and 6,101,726.

Additionally, the pushing member 29 should not be limited to the form of protrusion and should be understood as a device in any form which is defined to be able to push the blade.

The blade clamping device that described hereinabove is merely an embodiment of the present invention. The present invention is not limited as described and illustrated hereinabove. Other embodiments in variations to the preferred embodiments will be apparent to those skilled in the art and may be made without departing from the spirit and scope of the invention as defined in the appended claims.

What is claimed is:

1. A blade clamping device comprising:
   a main body which including two opposited sidewalls and a base connected therebetween for defining a cavity for receiving a blade therein;
   a fixing device mounted between the two sidewalls;
   a pivot lever pivotly mounted on the main body about an axis, and having a handle formed at one end thereof, with the other end operably connected to the fixing device for moving fixing device between a first position and a second position, wherein
      in the first position the fixing device fixedly hold the blade, and
      in the second position the blade is released;
   a first support formed on the main body;
   a second support formed on the pivot lever;
      a spring biased between the first support and the second support such that three relative positions are formed between the pivot lever and the main body, wherein
         a line is defined by the longitudinal axis of the spring, and wherein
         in the first relative position, said line intersects and is perpendicular to the pivot axis of the pivot lever, such that the spring is fully deflected and will bias the lever towards the second relative position if the lever is moved in a first direction and will bias the lever towards the third relative position if the lever is moved in a second direction
         in the second relative position, the pivot axis lies at one side of the line and the fixing device fixedly holds the blade,
         in the third relative position, the pivot axis lies at the other side of the line and the blade is released;
         wherein in the first relative position, the biasing force of the spring is the greatest.

2. The blade clamping device according to claim 1, wherein said fixing device comprising a cam.

3. The blade clamping device according to claim 2, further comprising a swing arm connected between said fixing device and said pivot lever, wherein one end of the swing arm being offset from the other end of the swing arm.

4. The blade clamping device according to claim 1, wherein said pivot lever is "U" shaped.

5. The blade clamping device according to claim 1, wherein the swing arm is held by an elongate slot of the pivot lever and being operably connected with said fixing device.

6. The blade clamping device according to claim 1, wherein the spring is stretched when the pivot lever and the main body is in the first relative position.

7. The blade clamping device according to claim 1, further comprising a fixing plate positioned in the cavity of said main body between the fixing device and the blade.

8. The blade clamping device according to claim 1, further comprising a pin protruding from the base of said main body and being able to be inserted into an aperture of the blade.

* * * * *